United States Patent
Cho et al.

(10) Patent No.: US 9,191,259 B2
(45) Date of Patent: Nov. 17, 2015

(54) METHOD AND DEVICE FOR SENSING FREQUENCY FOR OFDM SYSTEMS

(75) Inventors: Sang In Cho, Daejeon (KR); Kyu Min Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 13/884,175

(22) PCT Filed: Oct. 25, 2011

(86) PCT No.: PCT/KR2011/007963
§ 371 (c)(1),
(2), (4) Date: May 8, 2013

(87) PCT Pub. No.: WO2012/064030
PCT Pub. Date: May 18, 2012

(65) Prior Publication Data
US 2013/0223575 A1    Aug. 29, 2013

(30) Foreign Application Priority Data

Nov. 8, 2010    (KR) .................. 10-2010-0110440

(51) Int. Cl.
*H04L 27/06* (2006.01)
*H04L 27/26* (2006.01)
*H04L 27/00* (2006.01)

(52) U.S. Cl.
CPC .......... *H04L 27/265* (2013.01); *H04L 27/2647* (2013.01); *H04L 27/0006* (2013.01)

(58) Field of Classification Search
CPC ....... H04N 7/50; H04N 7/26244; H04B 3/32; H04B 25/03343
USPC .................................. 375/240, 285
See application file for complete search history.

(56) References Cited

U.S. PATENT DOCUMENTS

| | | | |
|---|---|---|---|
| 6,043,771 A * | 3/2000 | Clark et al. ...................... 342/13 |
| 6,163,276 A * | 12/2000 | Irving et al. ............... 340/870.4 |
| 2004/0114621 A1 | 6/2004 | Rotstein et al. |
| 2009/0016293 A1 | 1/2009 | Kang et al. |

FOREIGN PATENT DOCUMENTS

| | | |
|---|---|---|
| WO | 2008/010283 A1 | 1/2008 |
| WO | 2012/064030 A2 | 5/2012 |

OTHER PUBLICATIONS

International Search Report and Written Opinion for Application No. PCT/KR2011/007963, 10 pages, dated May 7, 2012.

* cited by examiner

*Primary Examiner* — Dac Ha
*Assistant Examiner* — Janice Tieu
(74) *Attorney, Agent, or Firm* — Rabin & Berdo, P.C.

(57) ABSTRACT

Provided is a frequency sensing method and apparatus in an orthogonal frequency division multiplexing (OFDM) system. Provided is a method of sensing a frequency of a received signal that is received from an outside in order to perform one of a plurality of radio communications. An OFDM apparatus may need to inspect a required frequency band before or after performing one of the plurality of radio communications, and to determine whether the frequency band is being used by another radio communication.

5 Claims, 4 Drawing Sheets

METHOD AND DEVICE FOR SENSING FREQUENCY FOR OFDM SYSTEMS

RELATED APPLICATIONS

This application is a 35 U.S.C. §371 filing of International Application Number PCT/KR2011/007963 which was filed on Oct. 25, 2011, and which claims priority to, and the benefit of, Korean Application Nos. 10-2010-0110440, filed on Nov. 8, 2010. The contents of the aforementioned applications are hereby incorporated herein by reference.

TECHNICAL FIELD

Embodiments of the present invention relate to a frequency sensing method and apparatus in an orthogonal frequency division multiplexing (OFDM) system, and to a method of sensing a frequency of a received signal that is received from an outside in order to perform one of a plurality of radio communications.

BACKGROUND ART

To efficiently use limited frequency resources, there has been constructed a communication environment that may support different radio communication systems in the same frequency band and support different communication schemes in a single terminal.

When a predetermined radio communication system desires to operate, it may be difficult for the radio communication system to be aware of an environment of a frequency band that the radio communication system desires to use, which may interfere with a communication of another radio communication system.

To solve the above issue, a conventional radio communication system may need to inspect in advance a frequency band to be used and may pre-determine whether the frequency band is being used by another radio communication system, prior to initiating a communication of the radio communication system.

DISCLOSURE OF INVENTION

Technical Goals

An aspect of the present invention provides a frequency sensing method and apparatus in an orthogonal frequency division multiplexing (OFDM) system that may sense a frequency band of a target radio communication among a plurality of radio communications and may further inspect the sensed frequency band.

An aspect of the present invention also provides a frequency sensing method and apparatus in an OFDM system that may adaptively select and sense a sensing interval of a frequency band of a received signal and thereby provide a fast frequency sensing rate compared to a case where the overall frequency band of the received signal is sensed at a high resolution.

Technical Solutions

According to an aspect of the present invention, there is provided a method of sensing a frequency in an orthogonal frequency division multiplexing (OFDM) system, the method including: dividing a frequency band of a received signal into at least one subchannel through a first fast Fourier transform (FFT); detecting a subchannel including a valid signal, from the divided at least one subchannel; dividing the detected subchannel into at least one lower subchannel through a second FFT; and detecting a lower subchannel including the valid signal, from the divided at least one lower subchannel.

The frequency band of the received signal may be divided through a FFT and then, a frequency band including the valid signal may be re-divided through another FFT in the divided frequency band, and the re-divided frequency band may be sensed at a high resolution.

The frequency sensing method may further include filtering a frequency band of the detected subchannel. The dividing of the detected subchannel may include dividing the filtered frequency band of the subchannel into the at least one lower subchannel.

According to another aspect of the present invention, there is provided an apparatus for sensing a frequency in an OFDM system, the apparatus including: a first detection processing unit to divide a frequency band of a received signal into at least one subchannel through a first FFT, and to detect a subchannel including a valid signal, from the divided at least one subchannel; and a second detection processing unit to divide the detected subchannel into at least one lower subchannel through a second FFT, and to detect a lower subchannel including a valid signal, from the divided at least one lower subchannel.

The frequency band of the received signal may be divided through a FFT and then, a frequency band including the valid signal may be re-divided through another FFT in the divided frequency band, and the re-divided frequency band may be sensed at a high resolution.

The frequency sensing apparatus may further include a filtering processing unit to filter a signal of a frequency band of the detected subchannel, and to transfer the filtered signal to the second detection processing unit.

According to still another aspect of the present invention, there is provided a method of sensing a frequency in an OFDM system including a plurality of FFT units, the method including: obtaining a frequency band including at least one subchannel that is output after inputting a received signal into one of the plurality of FFT units; detecting a subchannel including a valid signal, from the at least one subchannel; obtaining a frequency band including at least one lower subchannel that is output after inputting a signal of a frequency band of the detected subchannel into another FFT unit among the plurality of FFT units; and detecting a lower subchannel including the valid signal, from the at least one lower subchannel.

According to yet another aspect of the present invention, there is provided an apparatus for sensing a frequency in an OFDM system including a plurality of FFT units, the apparatus including: a first detection processing unit to input a received signal into one of the plurality of FFT units, and to detect a subchannel including a valid signal, from at least one subchannel that is output in correspondence to the input; and a second detection processing unit to input the detected subchannel into another FFT unit among the plurality of FFT units, and to detect a lower subchannel including the valid signal, from at least one lower subchannel that is output in correspondence to the input.

Effect

According to embodiments of the present invention, to use a frequency band for a target radio communication, it is possible to secure the reliability of a radio communication and to prevent interference with another radio communication by sensing the frequency band in advance.

Also, according to embodiments of the present invention, it is possible to more accurately detect a signal, and to decrease a false alarm probability by enhancing a frequency sensing resolution through an iterative use of a fast Fourier transform (FFT) unit.

Also, according to embodiments of the present invention, it is possible to perform frequency sensing using a provided FFT unit by applying an orthogonal frequency division multiplexing (OFDM) system including a plurality of FFT units. Therefore, there is no need to install a separate FFT unit.

BEST MODE FOR CARRYING OUT THE INVENTION

Figure 1:
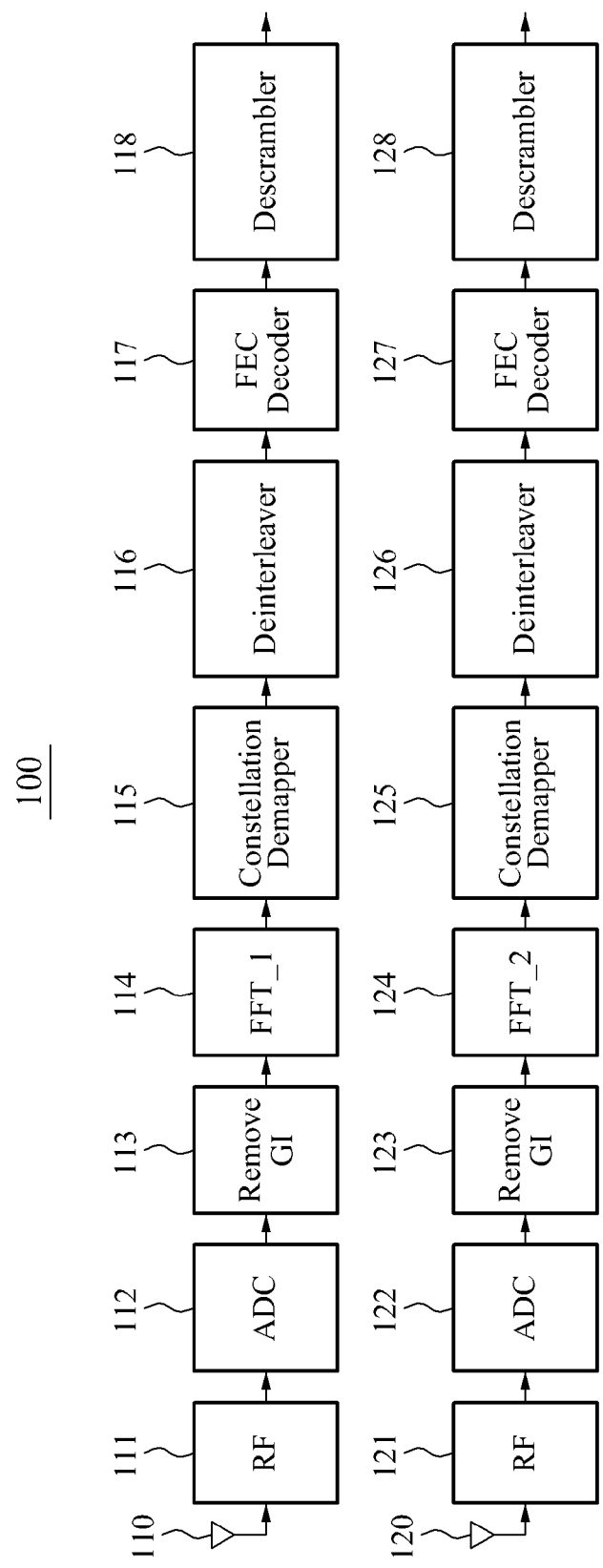
FIG. 1 is a block diagram illustrating an example of an orthogonal frequency division multiplexing (OFDM) system including a plurality of fast Fourier transform (FFTs) units.

Reference will now be made in detail to embodiments of the present invention, examples of which are illustrated in the accompanying drawings, wherein like reference numerals refer to the like elements throughout. The embodiments are described below in order to explain the present invention by referring to the figures.

According to embodiments of the present invention, different radio systems may coexist in the same frequency band to efficiently use limited frequency resources, and it is possible to construct a communication environment capable of supporting different schemes to provide an enhanced service in a single terminal. That is, in the complex communication environment, frequency sensing may be required to secure reliable communication.

A frequency sensing method according to an embodiment of the present invention may be disclosed to determine whether a frequency band to be used for a single radio communication is being used for another radio communication before or after the single radio communication operates, or to determine whether another radio communication to be protected operates while the radio communication is operating.

Also, a frequency sensing apparatus according to an embodiment of the present invention may be applied to an orthogonal frequency division multiplexing (OFDM) system including a plurality of fast Fourier transform FFT units to thereby interwork with the FFT units that are included in the OFDM system.

The OFDM system including the plurality of FFT units may be a multiple input multiple output (MIMO) OFDM system or a multiband OFDM system, and, for example, may be configured as shown in FIG. 1.

Referring to FIG. 1, a receiving apparatus of an OFDM system 100 may sequentially parallel process received signal that are received by at least two antennas 110 and 120, and may demodulate the received signals. Here, when the receiving apparatus is configured as a multiband OFDM system, a received signal may be transmitted to a plurality of frequency bands having different radio frequency (RF) center frequencies and thus, a width of a frequency band to be sensed may be wider than other systems.

Each of RF ends 111 and 121 may obtain the received signal that is received via the respective antennas 110 and 120, and may convert the received signal to an analog baseband signal. Each of analog-to-digital converters (ADCs) 112 and 122 may convert the analog baseband signal to a digital baseband signal. Each of remove guard intervals (GIs) 113 and 123 may remove a preset guard interval in the converted digital baseband signal. Each of a first fast Fourier transform (FFT) unit 114 and a second FFT unit 124 may perform FFT of the signal in which the guard interval is removed. Each of constellation demappers 115 and 125 may demodulate the fast Fourier transformed signal and then transfer the demodulated signal to respective corresponding deinterleavers 116 and 126. The signals transferred to the deinterleavers 116 and 126 may be decoded through forward error correction (FEC) decoders 117 and 127, and descramblers 118 and 128, respectively.

As described above, the receiving apparatus that may be configured as the MIMO OFDM system or the multiband OFDM system may sequentially parallel process received signals by installing a FFT unit for each radio communication.

Figure 2:
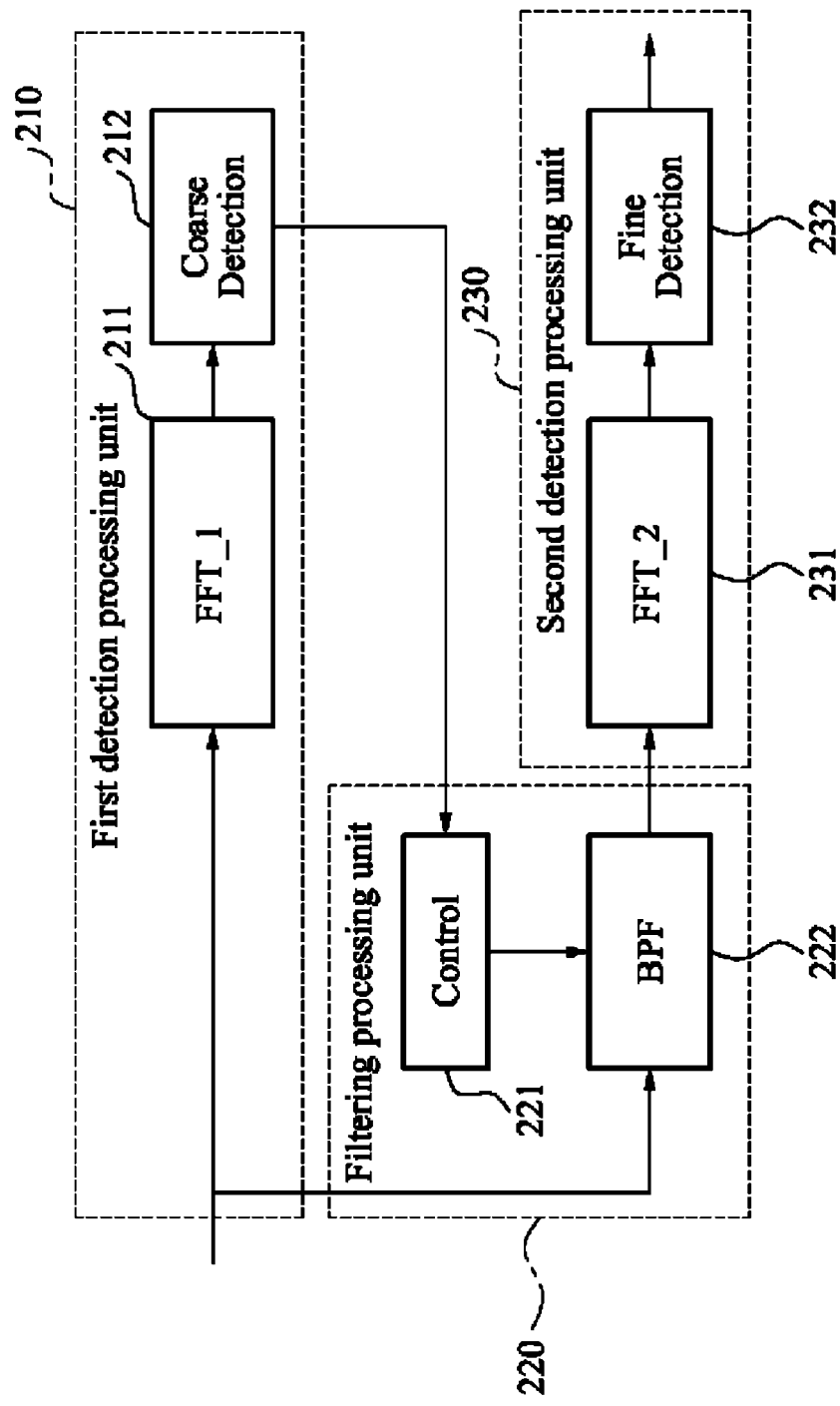
FIG. 2 is a block diagram illustrating a configuration of a frequency sensing apparatus according to an embodiment of the present invention.

FIG. 2 is a block diagram illustrating a configuration of an apparatus that performs a frequency sensing method according to an embodiment of the present invention. The apparatus may be installed in a receiving apparatus of an OFDM system to thereby sense a frequency band of a received signal.

Referring to FIG. 2, the apparatus may include a first detection processing unit 210, a filtering processing unit 220, and a second processing unit 230.

The first detection processing unit 210 may divide a frequency band of a received signal into at least one subchannel through a first FFT, and may detect a subchannel including a valid signal, from the divided at least one subchannel. Also, the first detection processing unit 210 may include a first FFT (FFT_1) unit 211 and a coarse detector 212.

The first FFT 211 may divide the frequency band of the received signal by performing first FFT. Here, when it is assumed that a width of the frequency band of the received signal is W and the first FFT unit 211 performs N-point processing, the width of the frequency band of the signal divided by the first FFT unit 211 may become W/N. That is, a subchannel resolution of the first FFT unit 211 may become W/N.

The coarse detector 212 may inspect the frequency band that is divided into at least one subchannel, and may output a subchannel including a valid signal. Here, when the subchannel including the valid signal is not output, the frequency sensing procedure of the present invention may be terminated. On the contrary, when the subchannel including the valid signal is output, a signal corresponding to the detected subchannel may be transferred to the filtering processing unit 220.

The filtering processing unit 220 may filter the frequency band of the subchannel detected by the first detection processing unit 221. Here, the filtering processing unit 220 may include a control unit 221 and a band pass filter (BPF) 222.

The control unit 221 may output a filter coefficient corresponding to the frequency band of the subchannel detected by the first detection processing unit 210.

The BPF 222 may filter the received signal according to the frequency band of the detected subchannel, to obtain a band-pass-filtered received signal based on the filter coefficient that is output by the control unit 221.

The second detection processing unit 230 may divide the detected subchannel of the filtered frequency band into at least one lower subchannel through a second FFT, and to detect a lower subchannel including a valid signal, from the at least one lower subchannel. Here, the second detection processing unit 230 may include a second FFT (FFT_2) unit 231 and a fine detector 232.

The second FFT (FFT_2) 231 unit may divide the detected subchannel of the filtered frequency band by performing second FFT. Here, when it is assumed that a width of the filtered frequency band is B and the second FFT unit 231 performs N-point processing, the width of the frequency band divided by the second FFT unit 231 may become B/N. That is, a subchannel resolution of the second FFT unit 231 may become B/N.

The fine detector 231 may inspect a frequency band that is divided into at least one lower subchannel, and may output a lower subchannel including the valid signal. Here, when the (*lower subchannel including the valid signal is not output from the fine detector 232, the frequency sensing procedure of the present invention may be terminated. On the contrary, when the (*lower subchannel including the valid signal is output, the frequency sensing apparatus may generate an alarm indicating the presence of the valid signal.

Therefore, the frequency sensing apparatus according to an embodiment of the present invention may repeatedly divide a received signal using a plurality of FFT units and then divide a frequency band of the received signal to be narrow. Next, the frequency sensing apparatus may inspect a band including the valid signal at a fine resolution and thereby sense the band including the valid signal.

That is, frequency band of the received signal may be divided through a FFT and then, the frequency band including the valid signal may be re-divided through another FFT in the divided frequency band, and the re-divided frequency band may be sensed at a high resolution.

In particular, the width B of the frequency band to be divided by the second FFT unit 231 is narrower than the width W of the frequency band of the received signal and thus, the fine detector 232 may detect the valid signal at a more fine resolution compared to the coarse detector 212.

Further, according to an embodiment of the present invention, it is possible to perform frequency sensing at a more fine resolution by configuring an FFT that performs N-point processing through combination of N/M-point FFT units. For example, when M=2, it is possible to adjust a subchannel resolution to be 2B/N by configuring a single N-point FFT unit as two converters that are N/2-point.

Figure 3:
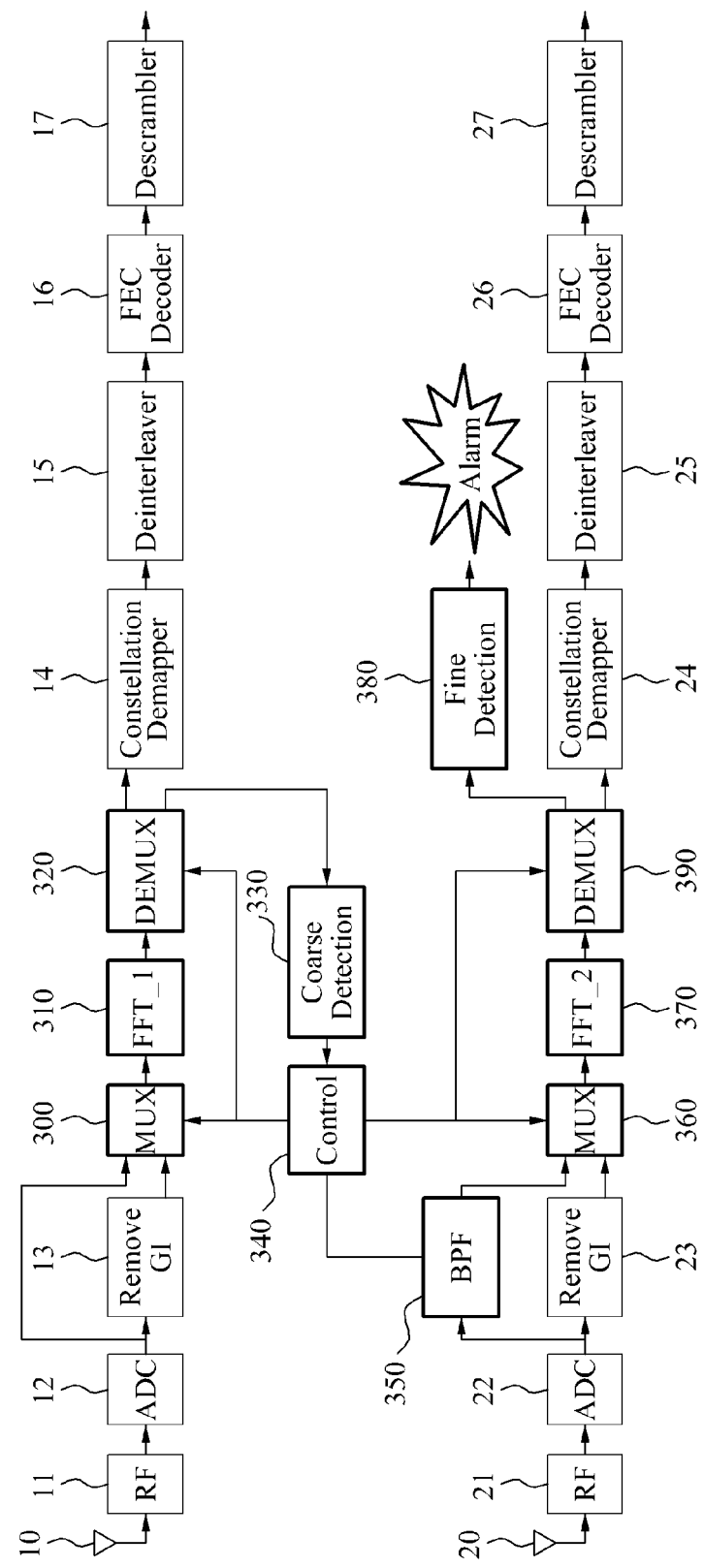
FIG. 3 is a block diagram illustrating an example in which a frequency sensing apparatus is applied to an OFDM system including a plurality of FFT units according to an embodiment of the present invention.

FIG. 3 is a block diagram illustrating an example in which a frequency sensing apparatus of FIG. 1 is applied to an OFDM system including a plurality of FFT units according to an embodiment of the present invention. Here, the OFDM system including the plurality of FFT units may be a MIMO OFDM system, a multiband OFDM system, and the like.

In interaction with the plurality of FFT units included in the OFDM system, the frequency sensing apparatus may input a received signal into the plurality of FFT units to be divided and enables the divided signals to be sensed by the plurality of FFT units, respectively.

Antennas 10 and 20, RF ends 11 and 21, ADCs 12 and 22, remove GIs 13 and 23, constellation demappers 14 and 24, deinterleavers 15 and 25, FEC decoders 16 and 26, and descramblers 17 and 27 of FIG. 3 may be configured to be the same as the antennas 110 and 120, the RF ends 111 and 121, the ADCs 112 and 122, the remove GIs 113 and 123, the constellation demappers 115 and 125, the deinterleavers 116 and 126, the FEC decoders 117 and 127, and the descramblers 118 and 128 of FIG. 1, respectively. Also, a first FFT unit 310 and a second FFT unit 370 of FIG. 3 may be configured to be the same as the first FFT unit 114 and the second FFT unit 124 of FIG. 1, respectively.

The frequency sensing apparatus may dispose a multiplexer (MUX) and a demultiplexer (DEMUX) at an input and an output of each of the first FFT 310 and the second FFT 370, respectively, and may configure a frequency sensing mode and an OFDM receive mode of the OFDM system according to a control of a control unit 340.

That is, the control unit 340 may control each of the MUX and the DEMUX to control a signal transfer path within the OFDM system, depending on whether a mode of the OFDM system is the OFDM receive mode or the frequency sensing mode. Here, the frequency sensing mode may correspond to a mode for performing a frequency sensing method according to an embodiment of the present invention.

Therefore, when the mode of the OFDM system is the frequency sensing mode, the control unit 340 may enable a signal transfer within the OFDM system to be performed in an order of the antenna 10, the RF end 11, the ADC 12, a first MUX 300, the first FFT 310, a first DEMUX 320, a coarse detector 330, the control unit 340, a BPF 350, a second MUX 360, the second FFT unit 370, a second DEMUX 380, and a fine detector 390 by controlling the first MUX 300, the first DEMUX 320, the second MUX 360, and the second DEMUX 380.

That is, the first MUX 300 may input, into the first FFT unit 310, a signal that is output from the ADC 12. The first DEMUX 320 may transfer, to the coarse detector 330, a signal that is output from the first FFT unit 310, in correspondence to the input.

When a signal of a frequency band including a valid signal is detected in the signal transferred to the coarse detector 330, the detected signal may pass through the control unit 340 and thereby be transferred to the BPF 350. The second MUX 360 may input, into the second FFT unit 370, a signal that is filtered by the BPF 350. The second DEMUX 380 may transfer, to the fine detector 390, a signal that is divided by the second FFT unit 370.

Here, the first FFT unit 310, the coarse detector 330, the BPF 350, the second FFT unit 370, and the fine detector 390 of FIG. 3 may be configured to be the same as the first FFT 211, the coarse detector 212, the BPF 222, the second FFT 231, and the fine detector 232 of FIG. 2.

Therefore, an OFDM system including a plurality of FFT units according to an embodiment of the present invention may perform a frequency sensing procedure using the FFT units.

Figure 4:
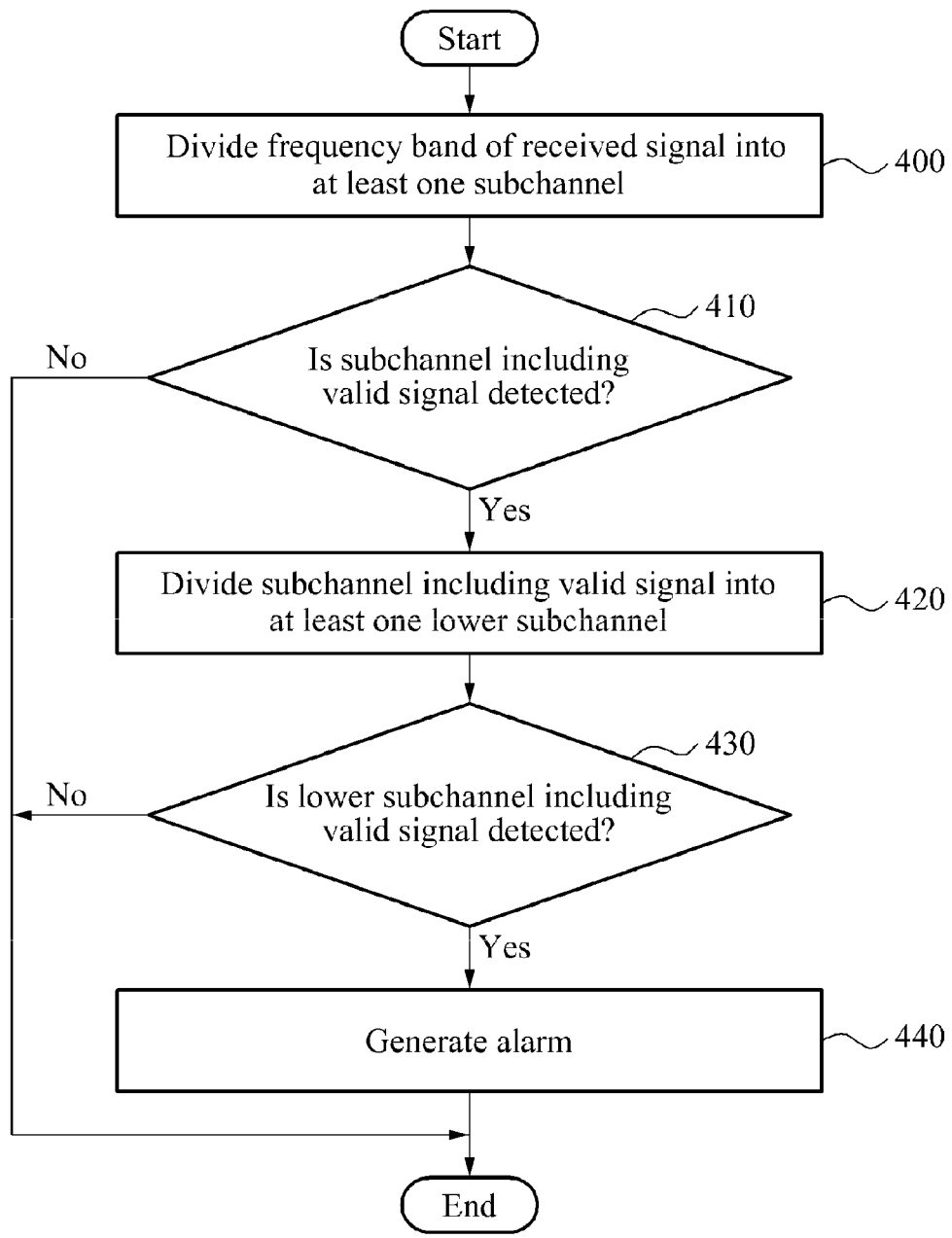
FIG. 4 is a flowchart illustrating a frequency sensing method according to an embodiment of the present invention.

FIG. 4 is a flowchart illustrating a frequency sensing method according to an embodiment of the present invention.

Referring to FIG. 4, in operation 400, a frequency band of a received signal may be divided into at least one subchannel through a first FFT.

In operation 410, a subchannel including a valid signal may be detected from the at least one subchannel.

When the subchannel including the valid signal is detected in operation 410, the detected subchannel may be divided into at least one lower subchannel through a second FFT in operation 420.

In operation 430, a lower subchannel including the valid signal may be detected from at least one lower subchannel.

When the lower subchannel including the valid signal is detected in operation 430, an alarm indicating the presence of the valid signal may be generated in operation 440.

The above-described exemplary embodiments of the present invention may be recorded in computer-readable media including program instructions to implement various operations embodied by a computer. The media may also include, alone or in combination with the program instructions, data files, data structures, and the like. Program instructions recorded in the media may be specially designed and be configured for the present invention, or may be known to and thereby be used by those skilled in computer software.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of sensing a frequency in an orthogonal frequency division multiplexing (OFDM) system, the method comprising:
dividing a frequency band of a received signal into a plurality of first subchannels through a first fast Fourier transform (FFT);
detecting one subchannel including a valid signal from the divided plurality of first subchannels;
outputting a filter coefficient corresponding to the frequency band of the detected subchannel;
filtering the received signal according to the frequency band of the detected subchannel, to obtain a band-pass-filtered received signal, based on the filter coefficient;
dividing the frequency band of the band-pass-filtered received signal into a plurality of second subchannels through a second FFT; and
detecting another subchannel including the valid signal from the divided plurality of second subchannels of the band-pass-filtered received signal.

2. The method of claim 1, further comprising:
(a) with respect to the detected another subchannel of the band-pass-filtered received signal,
filtering the received signal to obtain another band-pass-filtered received signal, of which a frequency band equals to that of the detected another subchannel of the band-pass-filtered received signal;
dividing the frequency band of the another band-pass-filtered received signal into a plurality of third subchannels through another FFT, and
detecting a third subchannel including the valid signal from the divided plurality of third subchannels of the another band-pass-filtered received signal; and
(b) repeating steps (a) and (b) with respect to the detected third subchannel of the another band-pass-filtered received signal.

3. An apparatus for sensing a frequency in an orthogonal frequency division multiplexing (OFDM) system, the apparatus comprising:
a first detection processing unit configured to divide a frequency band of a received signal into a plurality of first subchannels through a first fast Fourier transform (FFT), and to detect one subchannel including a valid signal from the divided plurality of first subchannels;
a filtering processing unit configured
to output a filter coefficient corresponding to the frequency band of the detected subchannel, and
to filter the received signal according to the frequency band of the detected subchannel, to obtain a band-pass-filtered received signal, based on the filter coefficient; and
a second detection processing unit configured to divide the frequency band of the band-pass-filtered received signal into a plurality of second subchannels through a second FFT, and to detect another subchannel including the valid signal from the divided plurality of second subchannels of the band-pass-filtered received signal.

4. A method of sensing a frequency in an orthogonal frequency division multiplexing (OFDM) system comprising a plurality of fast Fourier transform (FFT) units, the method comprising:
obtaining a frequency band including a plurality of first subchannels that is output after inputting a received signal into one of the plurality of FFT units;
detecting one subchannel including a valid signal from the plurality of first subchannels;
outputting a filter coefficient corresponding to the frequency band of the detected subchannel;
filtering the received signal according to the frequency band of the detected subchannel, to obtain a band-pass-filtered received signal, based on the filter coefficient;
obtaining another frequency band including a plurality of second subchannels that is output after inputting the band-pass-filtered received signal into another FFT unit among the plurality of FFT units; and
detecting another subchannel including the valid signal from the plurality of second subchannels of the band-pass-filtered received signal.

5. An apparatus for sensing a frequency in an orthogonal frequency division multiplexing (OFDM) system comprising a plurality of fast Fourier transform (FFT) units, the apparatus comprising:
a first detection processing unit configured to input a received signal into one of the plurality of FFT units to thereby divide a frequency band of the received signal into a plurality of first subchannels, and to detect one subchannel including a valid signal from the plurality of first subchannels;
a filtering processing unit configured to output a filter coefficient corresponding to the frequency band of the detected subchannel, and to filter the received signal according to the frequency band of the detected subchannel, to obtain a band-pass-filtered received signal, based on the filter coefficient; and
a second detection processing unit configured to input the band-pass-filtered received signal into another FFT unit among the plurality of FFT units to thereby divide the frequency band of the band-pass-filtered received signal into a plurality of second subchannels, and to detect another subchannel including the valid signal from the plurality of second subchannels of the band-pass-filtered received signal.

* * * * *